US012118787B2

United States Patent
Jin et al.

(10) Patent No.: US 12,118,787 B2
(45) Date of Patent: Oct. 15, 2024

(54) LOCALIZATION OF NARRATIONS IN IMAGE DATA

(71) Applicant: ADOBE INC., San Jose, CA (US)

(72) Inventors: Hailin Jin, San Jose, CA (US); Bryan Russell, San Jose, CA (US); Reuben Xin Hong Tan, San Jose, CA (US)

(73) Assignee: ADOBE INC., San Jose, CA (US)

( * ) Notice: Subject to any disclaimer, the term of this patent is extended or adjusted under 35 U.S.C. 154(b) by 370 days.

(21) Appl. No.: 17/499,193

(22) Filed: Oct. 12, 2021

(65) Prior Publication Data
US 2023/0115551 A1    Apr. 13, 2023

(51) Int. Cl.
| | |
|---|---|
| G06K 9/00 | (2022.01) |
| G06F 18/214 | (2023.01) |
| G06F 18/22 | (2023.01) |
| G06N 3/04 | (2023.01) |
| G06V 20/40 | (2022.01) |
| G10L 15/02 | (2006.01) |
| G10L 15/16 | (2006.01) |
| G10L 15/19 | (2013.01) |
| G10L 15/26 | (2006.01) |

(52) U.S. Cl.
CPC ............ *G06V 20/41* (2022.01); *G06F 18/214* (2023.01); *G06F 18/22* (2023.01); *G06N 3/04* (2013.01); *G06V 20/46* (2022.01); *G10L 15/02* (2013.01); *G10L 15/16* (2013.01); *G10L 15/19* (2013.01); *G10L 15/26* (2013.01)

(58) Field of Classification Search
CPC .................................................... G06V 10/82
See application file for complete search history.

(56) References Cited

U.S. PATENT DOCUMENTS

| | | | |
|---|---|---|---|
| 8,687,880 B2 * | 4/2014 | Wei ...................... | G06V 40/171 |
| | | | 382/159 |
| 11,445,267 B1 * | 9/2022 | Hori ....................... | G06V 10/82 |
| (Continued) | | | |

OTHER PUBLICATIONS

Mroueh, Youssef, Etienne Marcheret, and Vaibhava Goel. "Deep multimodal learning for audio-visual speech recognition." 2015 IEEE International Conference on Acoustics, Speech and Signal Processing (ICASSP). IEEE, 2015. (Year: 2015).*

(Continued)

*Primary Examiner* — Hadi Akhavannik
(74) *Attorney, Agent, or Firm* — Shook, Hardy & Bacon L.L.P.

(57) ABSTRACT

Methods, system, and computer storage media are provided for multi-modal localization. Input data comprising two modalities, such as image data and corresponding text or audio data, may be received. A phrase may be extracted from the text or audio data, and a neural network system may be utilized to spatially and temporally localize the phrase within the image data. The neural network system may include a plurality of cross-modal attention layers that each compare features across the first and second modalities without comparing features of the same modality. Using the cross-modal attention layers, a region or subset of pixels within one or more frames of the image data may be identified as corresponding to the phrase, and a localization indicator may be presented for display with the image data. Embodiments may also include unsupervised training of the neural network system.

19 Claims, 10 Drawing Sheets

(56) References Cited

U.S. PATENT DOCUMENTS

| | | | |
|---|---|---|---|
| 2004/0062442 A1* | 4/2004 | Laumeyer | G06V 10/443 |
| | | | 382/104 |
| 2004/0254790 A1* | 12/2004 | Novak | G10L 15/08 |
| | | | 704/240 |
| 2004/0264767 A1* | 12/2004 | Pettigrew | H04N 5/272 |
| | | | 348/E9.037 |
| 2013/0308922 A1* | 11/2013 | Sano | H04N 21/47217 |
| | | | 386/245 |
| 2014/0247993 A1* | 9/2014 | Lin | G06V 40/171 |
| | | | 382/195 |
| 2015/0178990 A1* | 6/2015 | Ng-Thow-Hing | G06F 3/017 |
| | | | 715/850 |
| 2020/0143211 A1* | 5/2020 | Lai | G06V 30/19173 |
| 2022/0150661 A1* | 5/2022 | Taghizadeh | G06N 3/08 |

OTHER PUBLICATIONS

Lee, Jun-Tae, et al. "Cross-attentional audio-visual fusion for weakly-supervised action localization." International conference on learning representations. 2020. (Year: 2020).*

Antoine Miech, "End-to-End Learning of Visual Representations from Uncurated Instructional Videos", Cornell University, Dec. 13, 2019, 14 Pages.

Chen Sun, "Learning Video Representations Using Contrastive Bidirectional Transformer", Cornell University, Jun. 13, 2019, 12 Pages.

Hassan Akbari, "Multi-level Multimodal Common Semantic Space for Image-Phrase Grounding", Cornell University, Nov. 28, 2018, 11 Pages.

* cited by examiner

LOCALIZATION OF NARRATIONS IN IMAGE DATA

BACKGROUND

Content creators often add voice-over narrations to videos to point out important moments and/or to provide additional details. The visual aspect in the video corresponding to the narration may be only a portion of what is in the frame. As such, it may be useful to spatially as well as temporally localize narrations and generate an indicator to guide the viewer to the relevant information in a frame as the video plays. Existing technologies can spatially localize a noun phrase to an object within an image, but they do not localize phrases or sentences in videos or perform on images or videos containing multiple objects and actions. Further, while temporal alignment of a video clip and a narration has been done, existing technology does not provide accurate alignment of spatial regions and narrations. Moreover, the amount of data needed to accurately train a machine learning model to predict temporal and spatial alignment is vast such that obtaining annotated ground truth data required for supervised training methods may be time consuming and a hindrance to developing such models.

SUMMARY

Embodiments of the present disclosure are directed towards automatic localization across different modalities, which refer to different types of data signals such as image data and text data. As described herein, to automatically localize across modalities, a neural network system is trained to determine similarity metrics between portions of two modalities, such as portions of image data and portions of audio or text data, to spatiotemporal localize the two modalities. In this way, the neural network system can identify a region of one modality, such as the image data, that corresponds to a portion of the other modality, such as a phrase within the text or audio data. To do this, the neural network system includes a plurality of cross-modal attention layers that compare features from one modality with features of another. In some aspects, the neural network system alternates cross-modal attention layers with at least one self-attention layer that compares features within a modality to each other. Example embodiments of the disclosure may include causing presentation, on a graphic user interface of a user device, of an indicator of the region that is identified as corresponding to the phrase.

Further embodiments of the disclosure include unsupervised training of the neural network system. Rather than using ground truth data, a contrastive loss value is determined using positive and negative spatiotemporal-word feature pairs. Specifically, spatiotemporal features are extracted from the first modality training data and word features are extracted from the second modality training data. The spatiotemporal and word features are passed through a plurality of cross-modal attention layers within the neural network system. A self-attention layer may also be utilized between cross-modal attention layers. From the attention layers, a final representation of a spatiotemporal-word feature pair is determined. A contrastive loss is computed from the representation as well as non-corresponding (negative) spatiotemporal-word feature pairs within the training data. Weights within one or more of the cross-modal attention layers may be adjusted based on the contrastive loss value.

This Summary is provided to introduce a selection of concepts in a simplified form that are further described below in the Detailed Description. This Summary is not intended to identify key features or essential features of the claimed object matter, nor is it intended to be used as an aid in determining the scope of the claimed object matter.

DETAILED DESCRIPTION

Figure 1:
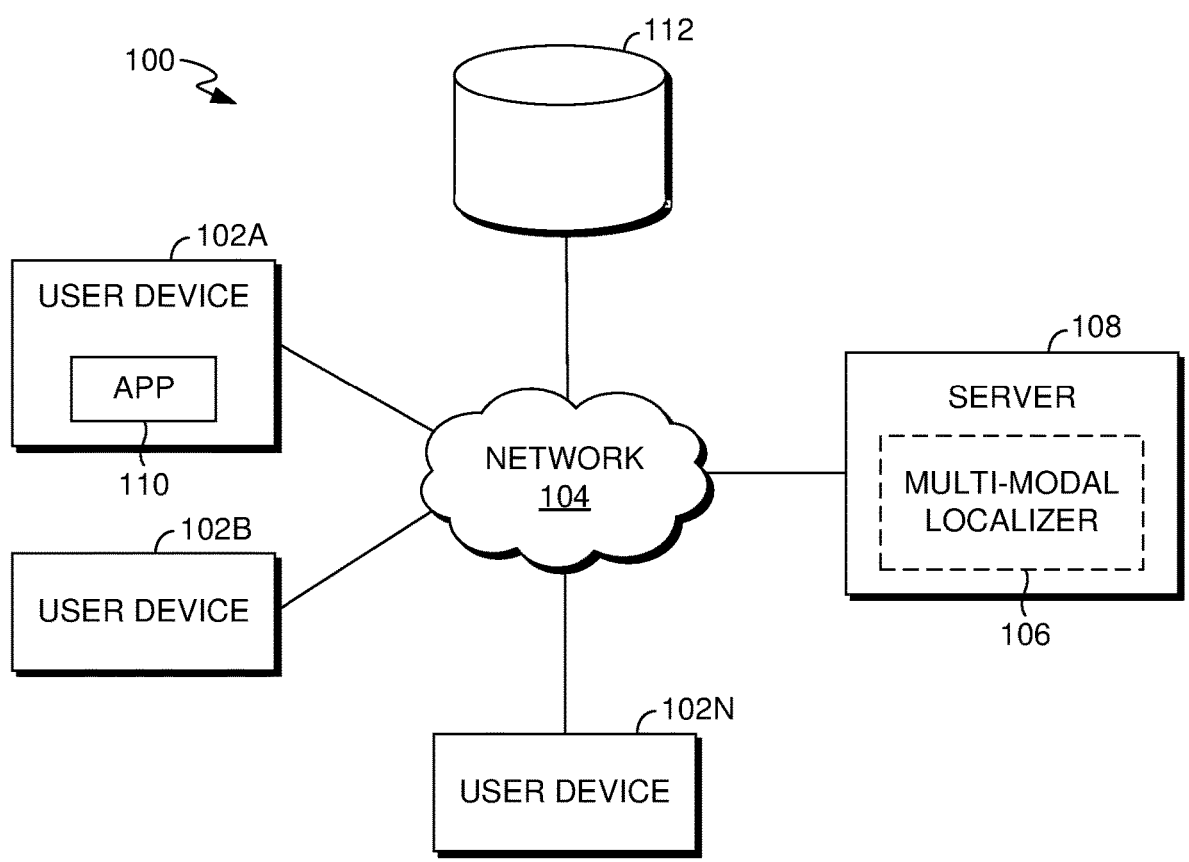
FIG. 1 depicts an example configuration of an operating environment in which implementations of the present disclosure can be employed.

The object matter of the present invention is described with specificity herein to meet statutory requirements. However, the description itself is not intended to limit the scope of this patent. Rather, the inventors have contemplated that the claimed object matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Content creators often add voice-over narrations to videos to point out important moments and/or to provide additional details. The visual aspect in the video that corresponds to the narration may be only a portion of what is in the frame. As such, it may be useful to spatially as well as temporally localize narrations and generate an indicator to guide the viewer to the relevant information in a frame as a video is playing. Existing technologies can spatially localize a noun phrase to an object within an image, but they do not localize phrases or sentences in video. In this way, existing technologies cannot discriminate between objects that are relevant to a particular action and similar objects that are not relevant to an action. Further, while temporal alignment of a video clip and a narration has been done, existing technology does not provide accurate alignment of spatial regions and narrations. Moreover, the amount of data needed to accurately train a machine learning model to predict temporal and spatial alignment is vast such that existing supervised training methods are not feasible. Specifically, obtaining annotated ground truth data required for supervised training methods may be time consuming and a hindrance to developing such models, and processing such ground truth data during training would require a lot of storage space and processing power.

Accordingly, embodiments of the present disclosure are directed to facilitating accurate multi-modal localization for complex situations, including spatiotemporally localizing narrations within videos and vice versa. At a high level, a neural network system is trained to determine similarity metrics between portions of two modalities, such as portions of image data and portions of audio or text data, to spatiotemporal localize the two modalities. In this way, the neural network can identify a region of one modality, such as the image data, that corresponds to a portion of the other modality, such as a phrase within the text or audio data. To do this, the neural network system includes a plurality of cross-modal attention layers that compare features from one modality with features of another. In some aspects, the neural network system alternates cross-modal attention layers with at least one self-attention layer that compares features within a modality to each other. The use of multiple cross-modal attention layers helps to prevent early fusion of features within the same modality to ensure better accuracy of the network.

For each set of modalities, there may be multiple pairs of features of each modality, and similarity metrics may be computed for each pair using the neural network system. For example, one phrase extracted from text or audio data may be paired with multiple regions within the image data. The region of the image data having the highest similarity metric when paired with the phrase may be determined to be the most likely to correspond to that particular phrase. In this way, the phrase may be spatiotemporally localized within the image data. Example embodiments of the disclosure may include causing presentation, on a graphic user interface of a user device, of an indicator of the identified region. The indicator may include a bounding box and/or a change in the visual properties (e.g., increase in brightness) of the region within the image data. Further, where the image data is a video clip, the indictor may be presented at a time that corresponds to presentation of the phrase from the audio or text data that corresponds to the region.

Some embodiments of the present disclosure include unsupervised training of the neural network system. Rather than using ground truth data, a contrastive loss value is determined using positive and negative spatiotemporal-word feature pairs. Specifically, spatiotemporal features are extracted from the first modality training data and word features are extracted from the second modality training data. The spatiotemporal and word features are passed through a plurality of cross-modal attention layers within the neural network system. A self-attention layer may also be utilized between cross-modal attention layers. From the attention layers, a final representation of a spatiotemporal-word feature pair is determined. A contrastive loss is computed from the representation as well as non-corresponding (negative) spatiotemporal-word feature pairs within the training data. Weights within one or more of the cross-modal attention layers may be adjusted based on the contrastive loss value to maximize the distance between non-corresponding pairs and minimize the distance between the positive pairs. By using a contrastive loss computed from positive and negative pairs, labeled ground truth data is not needed to train the neural network system, thereby allowing more data to be used for accurately training the neural network system without using the storage and processing resources that are often required for conventional supervised training methods.

As used herein, the term modality refers to a type of data signal, and localization across modalities, which may also be referred to herein as multi-modal localization, refers to localizing a portion of one type of data signal to a corresponding portion of another type of data signal. Localization includes identification of a particular portion of one modality as corresponding to a portion of another modality. Exemplary aspects include spatiotemporal localization of a language modality, such as audio or text data, within image data. For instance, a subset of pixels within a frame of the image data may be identified as corresponding to a portion of the audio or text data such that the subset of pixels visually depict what is being described in the audio or text data. The term image data is used herein to refer to data representing pictorial or graphic data, including video files, frames extracted from a video file, photographic images, digitally represented drawings, and/or digitally-created visual content.

FIG. 1 depicts an example configuration of an environment in which some implementations of the present disclosure can be employed for multi-modal localization. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that environment 100 shown in FIG. 1 is an example of one suitable operating environment. Among other components not shown, environment 100 includes a number of user devices, such as user devices 102a and 102b through 102n, network 104, server(s) 108, and database 112. Each of the components shown in FIG. 1 may be implemented via any type of computing device, such as one or more of computing device 900 described in connection to FIG. 9, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

User devices 102a through 102n may be any type of computing device capable of being operated by a user. For example, in some implementations, user devices 102a through 102n are the type of computing device described in relation to FIG. 9. By way of example and not limitation, a user device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices.

User devices 102a through 102n may include one or more processors and one or more computer-storage media. The computer-storage media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

Application 110 may generally be any application capable of facilitating the exchange of information between user devices 102a through 102n and the server(s) 108 in carrying out steps for multi-modal localization, including training a neural network to perform multi-modal localization. In some implementations, application 110 comprises a web application that can run in a web browser and could be hosted at least partially on the server-side of environment 100. In addition, or instead, application 110 comprise a dedicated application, such as an application having image processing functionalities, including but not limited to functionalities for image or video creation or editing, such as Adobe® Premiere®, Adobe® Premiere® Rush®, or Adobe® Spark Video for example. In some cases, application 110 is integrated into the operating system (e.g., as a service). It is, therefore, contemplated herein that "application" be interpreted broadly.

In accordance with embodiments herein, the application 110 is configured to facilitate spatiotemporal localization of one modality with another. In particular, a user can select or input data of one modality, such as audio data or text data, and data of a second modality, such as image data. The data may be selected or input in any manner, including inputting the data together as a single data object. For example, a user may take a video using a camera on a device, for example, user device 102a, which may include both audio and image data. As another example, a user may select a desired video with audio and image data from a repository, for example, stored in a data store accessible by a network, such as database 112, or stored locally at the user device 102a. In some embodiments, the two modalities are input separately, such as selecting or importing a video without audio data and separately selecting or importing audio data or text data that corresponds to the video.

As described herein, embodiments of server 108 also facilitate spatiotemporal location across multiple modalities via multi-modal localizer 106. Server 108 includes one or more processors, and one or more computer-storage media. The computer-storage media includes computer-readable instructions executable by the one or more processors. The instructions may optionally implement one or more components of multi-modal localizer 106, described in additional detail below. Multi-modal localizer 106 operates and, in some aspects trains, a neural network system to perform multi-modal localization.

At a high level, multi-modal localizer 106 identifies a portion of one modality that corresponds with a portion of another modality. Specifically, multi-modal localizer 106 may spatially and temporally localize a particular portion of one modality with another. In example aspects, a first modality is image data and a second modality is audio data or text data corresponding to the image data. For example, a video may include a narration in the form of audio data captured contemporaneously with the image data of the video or text describing what is happening in the image data. A phrase may be extracted from the audio or text data, and a region of the image data may be identified, via a neural network system, as corresponding to the phrase. Identification of this corresponding region is done utilizing a neural network system that includes multiple cross-modal attention layers for comparing features extracted from the image data with features extracted from the audio or text data.

Embodiments of multi-modal localizer 106 may further train the neural network system to perform multi-modal localization. Training of the neural network system may be done without supervision such that there is no labeled data to act as ground truth for modifying the neural network system. Instead, representations of spatiotemporal features from image data and word features from audio or text data that are generated by the neural network are compared to determine a contrastive loss, which may then be utilized to update the neural network.

For cloud-based implementations, the instructions on server 108 may implement one or more components of multi-modal localizer 106, and application 110 may be utilized by a user to interface with the functionality implemented on server(s) 108. In some cases, application 110 comprises a web browser. In other cases, server 108 may not be required. For example, the components of multi-modal localizer 106 may be implemented completely on a user device, such as user device 102a. In this case, multi-modal localizer 106 may be embodied at least partially by the instructions corresponding to application 110 and may be provided as an add-on or plug-in to application 110. Thus, it should be appreciated that multi-modal localizer 106 may be provided via multiple devices arranged in a distributed environment that collectively provide the functionality described herein. Additionally, other components not shown may also be included within the distributed environment. In addition, or alternatively, multi-modal localizer 106 may be integrated, at least partially, into a user device, such as user device 102a. Furthermore, multi-modal localizer 106 may at least partially be embodied as a cloud computing service.

Environment 100 of FIG. 1 further may include database 112, which may store computer instructions (e.g., software program instructions, routines, or services), data, and/or models used in embodiments described herein. In some implementations, database 112 stores information or data received via the various components of multi-modal localizer 106 and provides the various components with access to that information or data as needed. Although depicted as a single component, database 112 may be embodied as one or more data stores. Further, the information in database 112 may be distributed in any suitable manner across one or more data stores for storage (which may be hosted externally or internally).

Figure 2:
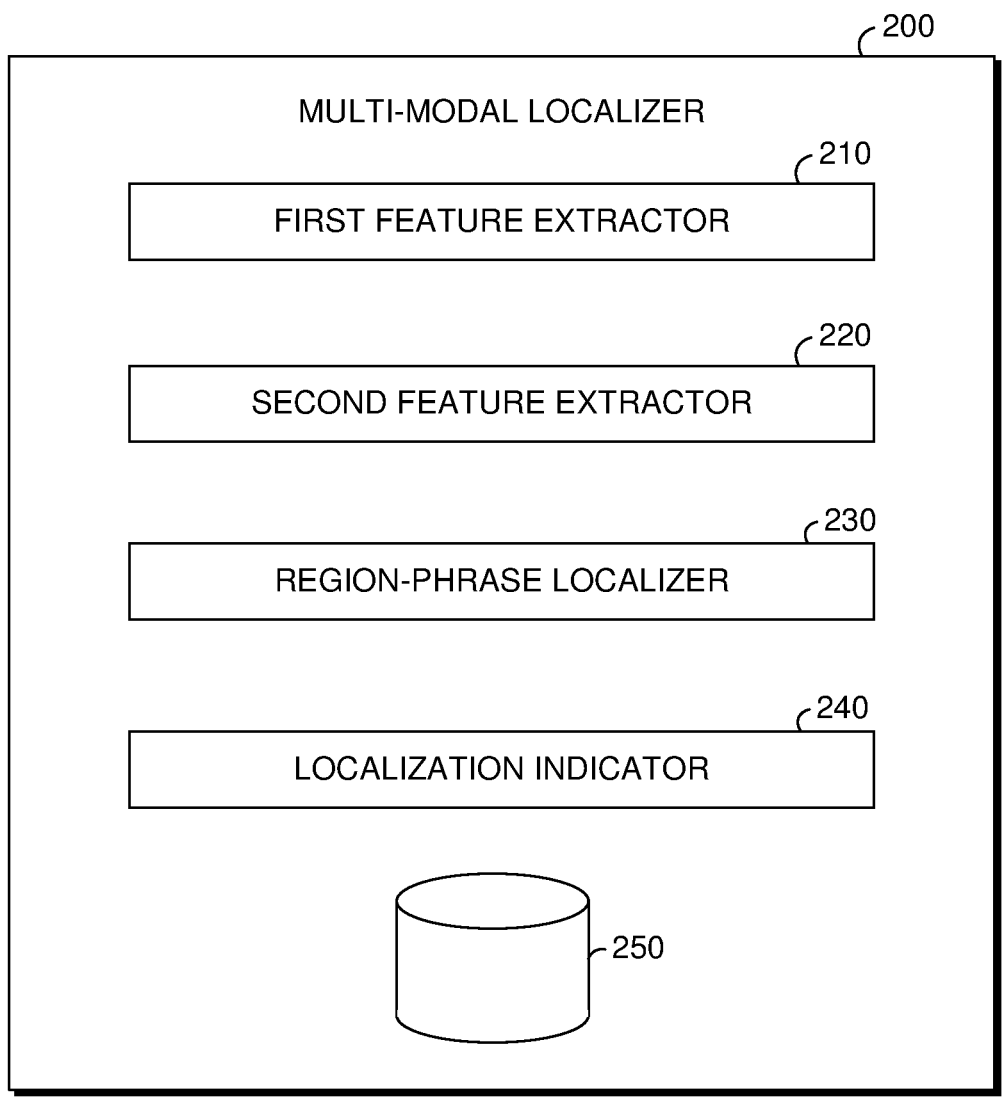
FIG. 2 depicts aspects of an example multi-modal localizer, in accordance with various embodiments of the present disclosure.

Referring to FIG. 2, aspects of an illustrative multi-modal localizer 200 are shown, in accordance with various embodiments of the present disclosure. Multi-modal localizer 200 includes a first feature extractor 210, a second feature extractor 220, a region-phrase localizer 230, a localization indicator 240, and a data store 250. The foregoing components of multi-modal localizer 200 can be implemented, for example, in operating environment 100 of FIG. 1. In particular, those components may be integrated into any suitable combination of user devices 102a and 102b through 102n, and server(s) 208, including as multi-modal localizer 106 of FIG. 1.

Data store 250 is used to store computer instructions (e.g., software program instructions, routines, or services), data, and/or models used in embodiments described herein. In some implementations, data store 250 stores information or data received via the various components of multi-modal localizer 200 and provides the various components with access to that information or data, as needed. Although depicted as a single component, data store 250 may be embodied as one or more data stores. Further, the information in data store 250 may be distributed in any suitable manner across one or more data stores for storage (which may be hosted externally).

In embodiments, data stored in data store 250 includes data of different modalities, such as image data and audio and/or text data. For example, in some aspects, data store 250 includes videos files having both image data and audio data and/or videos with corresponding audio or text data. The audio or text data may be narrating what is visually portrayed in the image data, including interactions between two objects. In some cases, data can be received by multi-modal localizer 200 from user devices (e.g., an input image received by either user device 102a, via, application 110). In other cases, data can be received from one or more data stores in the cloud.

Input data may be partitioned into separate modalities. For example, image data from a video file may be saved separately but in association with audio or text data. Where input data includes audio data, automatic speech recognition may be performed to convert spoken words in the audio data to text. Such automatic speech recognition may utilize one or more Hidden Markov models and neural networks, for example. In other embodiments, text data corresponding to the image data is input manually. From the text data, one or more phrases may then be extracted utilizing natural language processing techniques. Such phrases may include interactions. For example, from text data that includes: "put some oil into a pan and add chopped onions," two phrases may be extracted: "put some oil into a pan" and "add chopped onions."

The first feature extractor 210 is generally configured to extract features from a first modality, such as image data. The features extracted by the first feature extractor may be referred to herein as spatiotemporal features as they include different spatial and temporal portions of the image data. The first feature extractor 210 may include a video encoder, such as an S3D network, that encodes the image data as a representation of spatiotemporal features.

Similarly, the second feature extractor 220 is generally configured to extract features from a second modality representing a narration, such text data. The second feature extractor 220 may include one more natural language processing models, such as word2vec, that encodes the words to create a representation of word features. As described herein, embodiments of the disclosure may be utilized to localize phrases (which may include sentences) and, as such, the term word features, as used herein, may include representations of phrases and just individual words in some embodiments. The spatiotemporal and word feature representations may each be resized so that they have the same number of dimensions as one another.

Region-phrase localizer 230 is generally configured to localize a phrase from the second modality to a region of the first modality and vice-versa. The region of the first modality may be a spatiotemporal region such that it may indicate a particular frame within the image data, representing a temporal aspect, and a particular portion within the frame, representing a spatial aspect. Region-phrase localizer 230 may be a neural network that applies contrastive attention to determine similarities between two modalities. The neural network has multiple cross-modal attention layers for comparing spatiotemporal features from the first modality with word features from the second modality. Each cross-modal attention layer may compute new representations for a target modality with latent representations from a source modality to localize a phrase to a relevant region and vice versa. As either modality may be used for the target and the source, the cross-modal attention layers may be bidirectional where relevant regions may be learned for each phrase and relevant phrases may be learned for each feature. Using multiple cross-modal attention layers increases accuracy of region-phrase localizer 230 by utilizing more contextual features to compare within the two modalities as described further below.

Further, in exemplary aspects, the neural network also includes at least one self-attention layer that compares features from one modality to each other. A self-attention layer may serve to identify non-relevant spatiotemporal and phrase features by aggregating contextual information between unimodal features. The cross-modal attention layers may alternate with at least one self-attention layer. For example, one network architecture may include a first cross-modal attention layer, a first self-attention layer, and a second cross-modal attention layer. Alternating cross-modal attention layers with a self-attention layer helps to prevent early fusion that occurs with joint attention. Joint attention layers includes both intra-modal and inter-modal comparisons. While joint attention may be efficient, the two modalities can fuse, biasing a network to learn to cheat instead of learning the differences between the input features. In contrast, alternating cross-modal attention layers with a self-attention layer provides intra-model and inter-modal comparisons without early fusion and, therefore, leads to more accurate determinations of similarities between the features.

Figure 3A:
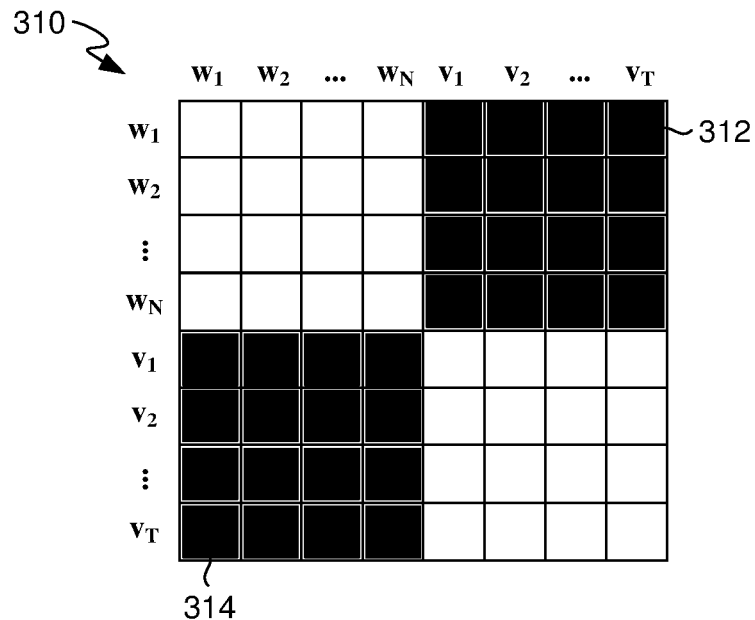
FIGS. 3A and 3B illustrate example binary masks for cross-modal attention and self-attention, in accordance with various embodiments of the present disclosure.

Each cross-modal attention layer may be formulated as a key/query/value attention mechanism. The queries may be spatiotemporal features while the keys and values are word features, and vice versa. A cross-modal attention layer may receive a cross-modal attention mask to instruct the network as to what features are being contrasted. FIG. 3A depicts an example cross-modal attention mask 310. The cross-modal attention mask 310 is a binary mask indicating what features are contrasted. Specifically, the shaded regions of the cross-modal attention mask 310 may represent "true" Boolean values where a query feature may select a key. Where the cross-modal attention mask 310 is "false" (i.e., unshaded regions), the corresponding query-key pair is not considered in computation of attention and weighted feature aggregation. Within this depiction in FIG. 3A, w represents word features and v represents spatiotemporal features. Shaded regions 312 represent where the word features are utilized for the queries and spatiotemporal features are utilized for the keys, and shaded regions 314 represent where spatiotemporal features are utilized for the queries and word features are utilized for the keys.

Applying a cross-attention modal layer may include computing the similarity between a query and a key and then computing the weighted sum of the value representations. A similarity score, which may also be referred to as a similarity measure, between a query and a key may be determined by determining the Hadamard product of query and key matrices. Alternative similarity measures may be used, such as dot product or cosine similarity.

In one example, let Q, K, V be the query, key and value matrices, respectively, and let the masked attention mechanism be represented as the following:

$$Attn(K,Q,V,M) = V \operatorname{softmax}\left(\frac{(Q^T K) \odot M}{\sqrt{D}}\right) \quad (1)$$

where M is a binary mask (such as the cross-modal attention mask 310), D denotes the dimensionality of the query, and $\odot$ is the Hadamard product. $C_{x,t}$ may represent a spatiotemporal feature at spatial location x in frame t as derived by first feature extractor 210, and $s_i$ be represent a word feature for the i-th word in a narration with N words as derived by the second feature extractor 220. Matrix inputs $C_0$ and $S_0$ may be obtained by stacking the spatiotemporal and word features $c_{x,t}$ and $s_i$, respectively, as column vectors. In this way, matrix $Y_0=[C_0, S_0]$ may be used to denote the stacked input features from both modalities, and $W_K^i$, $W_Q^i$ and $W_V^i$ may denote the projection matrices for keys, queries and values, respectively, for layer i. The output of a cross-modal attention layer may be computed by inputting in the projected spatiotemporal and word features into the following:

$$Y_i+1 = \operatorname{CrossAttn}(Y_i) = \operatorname{Attn}(W_K^i Y_i, W_Q^i Y_i, W_V^i Y_i, M_{CA}) \quad (2)$$

where $M_{CA}$ is the cross-modal attention mask. In this example where queries are spatiotemporal features and keys are word features, the similarity scores computed between the queries and keys depicted as the product in Equation 1 may act as a softmax mechanism to measure the relevance of each word feature with respect to a spatiotemporal feature. The softmax-normalized scores may be multiplied with the value (word features) vectors to compute a spatiotemporal-specific word representation. Where the queries are word features and keys are spatiotemporal features, a similar process may be performed to compute a word-specific spatiotemporal representation.

Figure 3B:
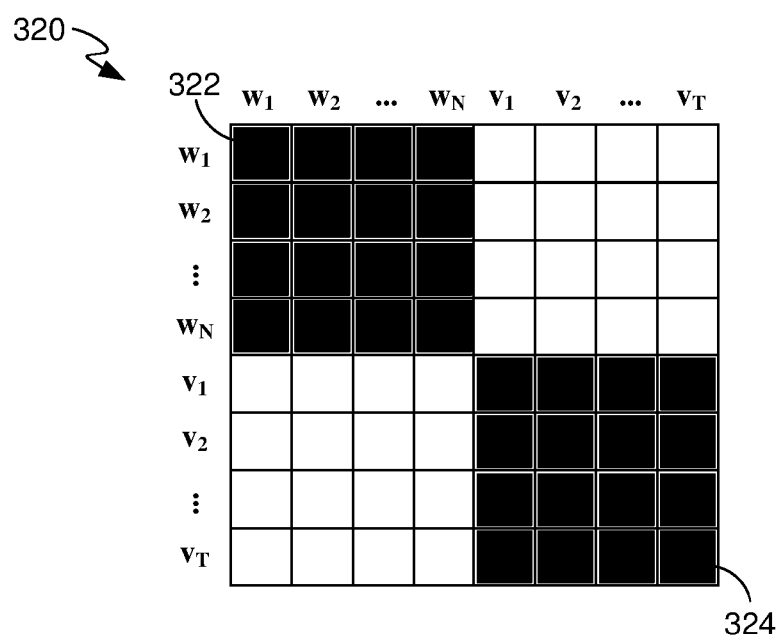

The output of the cross-modal attention layer may be passed to a self-attention layer along with a self-attention mask. FIG. 3B depicts an example self-attention mask 320 that may be used in the self-attention layer to ensure that attention is computed only between features of the same modality. Similar to the cross-modal attention mask 310, the self-attention mask includes shaded areas representing the query-key pairs that are considered in attention computation and weighted feature aggregated. Shaded regions 322 represent where the word features are utilized for both the queries and keys, and shaded regions 324 represent where spatiotemporal features are utilized for both the queries and keys. In this way, the self-attention layer may be used to separately aggregate contextual information over augmented representations of the two modalities. As such, the self-attention may be computed as the following:

$$Y_i+1 = \operatorname{SelfAttn}(Y_i) = \operatorname{Attn}(W_K^i Y_i, W_Q^i Y_i, W_V^i Y_i, M_{SA}) \quad (3)$$

where $M_{SA}$ is the self-attention mask (e.g., the self-attention mask 320). Additionally, $C_f$ and $S_f$ may denote the outputs of the proposed cross-modal attention module where $C_f \in \mathbb{R}^{D \times T}$ is the set of spatiotemporal representations and $S_f \in \mathbb{R}^{D \times N}$ is the set of word representations. $C_f$ and $S_f$ may then be computed as follows:

$$C_f, S_f = f_\theta(C_0, S_0) \quad (4)$$

where $f_\theta$ is a function representing the composition of the cross-attention and self-attention functions and parameterized by $\theta$. The function $f_\theta$ may be representation as follows:

$$f_\theta = CA_2(SA(CA_1(C_0, S_0)))$$

where $CA_1$ and $CA_2$ represent the cross-attention function described above for the first cross-attention layer and the second cross-attention layer, respectively, and SA represents the self-attention function described above.

The output of the self-attention layer is passed to a second cross-modal attention layer, along with binary cross-modal attention masks, to again contrast features between different modalities. The use of the second cross-modal attention layer provides for repeated early interactions of the features without fusing features of the two modalities. In implementation, it was determined that the use of two cross-modal attention layers alternating with a self-attention layer increases localization accuracy by at least 7.5 percentage points over an approach using only one cross-modal attention layer with self-attention.

Using the series of attention layers, similarities for multiple spatiotemporal-word pairs are determined. In exemplary aspects, a final attention heat map is created by mean-pooling similarity scores over all spatiotemporal regions. As such, the spatiotemporal representation ($\hat{C}$), which may also be referred to herein the region representation, and the word representation ($\hat{S}$), which may also be referred to herein as the phrase representation, may be represented as $$\hat{C} = \frac{1}{T}\frac{1}{X}\sum_{t=1}^{T}\sum_{x=1}^{X} C_{f t x} \text{ and } \hat{S} = \frac{1}{N}\sum_{j=1}^{N} S_{f j}$$

respectively. Further, in embodiments in which the temporal and spatial dimensions of the original image data are initially downsampled prior to attention, the attention heat map may be temporally and spatially interpolated back to the input resolution.

The spatiotemporal representation having the greatest similarity score for a given word representation is selected for the spatiotemporal localization of the phrase represented by the word representation. In this way, the selected spatiotemporal representation may be the pixel or group of pixels within a particular frame that most likely depict the phrase represented by the particular word representation. Often, a phrase may narrate something that is depicted over multiple pixels within a frame. As such, the spatiotemporal representation selected for the localization may be multiple pixels that have relative high similarity scores compared to other pixels. As such, exemplary aspects of the region-phrase localizer 230 may include a filter mechanism to identify a group of pixels having similarly high similarity scores for a given phrase. In an example aspect, a mode pixel algorithm is applied to identify the mode of a neighboring cluster of pixels so that similarities scores are determined for groups of pixels and the group having the highest similarity score is selected as the relevant spatiotemporal region.

Once the corresponding spatiotemporal region is determined for a phrase, localization indicator 240 may generate an indicator to depict the localization of the phrase to the particular spatiotemporal region to a user. As such, the localization indicator 240 may generate an indicator of the localization that will be provided for display on a graphic user interface of a user device, such as user device 102*a* of FIG. 1. In various aspects, the localization indicator 240 may generate an indicator my modifying the input image data with the indicator so that the indicator will be displayed when the image data is displayed.

The indicator may be an additional graphic object that is arranged over the localized region within the frame when the image data is displayed. For example, an outline of a square or box around the localized region may be provided for display by the localization indicator 240, such as the example indicators depicted in FIGS. 5A-5D. Additionally or alternatively, the indicator may include changing one or more visual properties of the pixels that make up the localized region. For example, the localization indicator 240 may increase the brightness level or change color channel levels of pixels forming the localized region. Further, localization indicator 240 may change visual properties of the non-localized region within a frame to create a visual contrast with the localized region. For instance, the localization indicator 240 may lower the brightness of the non-localized region and/or change the non-localized region to gray-scale while either leaving the localized region unchanged or making different visual changes to the localized region.

Multiple pairs of phrases and regions from input image data, such as one video clip, may be localized in the disclosed manner by the multi-modal localizer 200. As such, multiple indicators of the localization may be provided by the localization indicator 240 such that a user watching the video clip may be able to visually localize various actions that are relevant to the audio data at the time the audio data is output.

In some embodiments, a user may have control over which indicators for various localizations are being provided for display. For example, a user may want to focus on visually highlighting only certain actions and, therefore, may not want indicators for all localizations determined for a video clip to be presented during playback. In some embodiments, all indicators are provided for display by default, and a user may remove any unwanted localizations. In other aspects, all localization indicators may be provided as options for display, and a user selects certain indicators for display. Further, in some embodiments, users may have control over the duration of time that a localization indicator is provided for display. For instance, a user may want an action to be visually highlighted for only a brief duration, such as three seconds, even if the corresponding phrase in the audio data takes longer to be output. Durations of display of a localization indicator may be set by the user to a default duration and/or may be individually input for each localization indicator.

Figure 4:
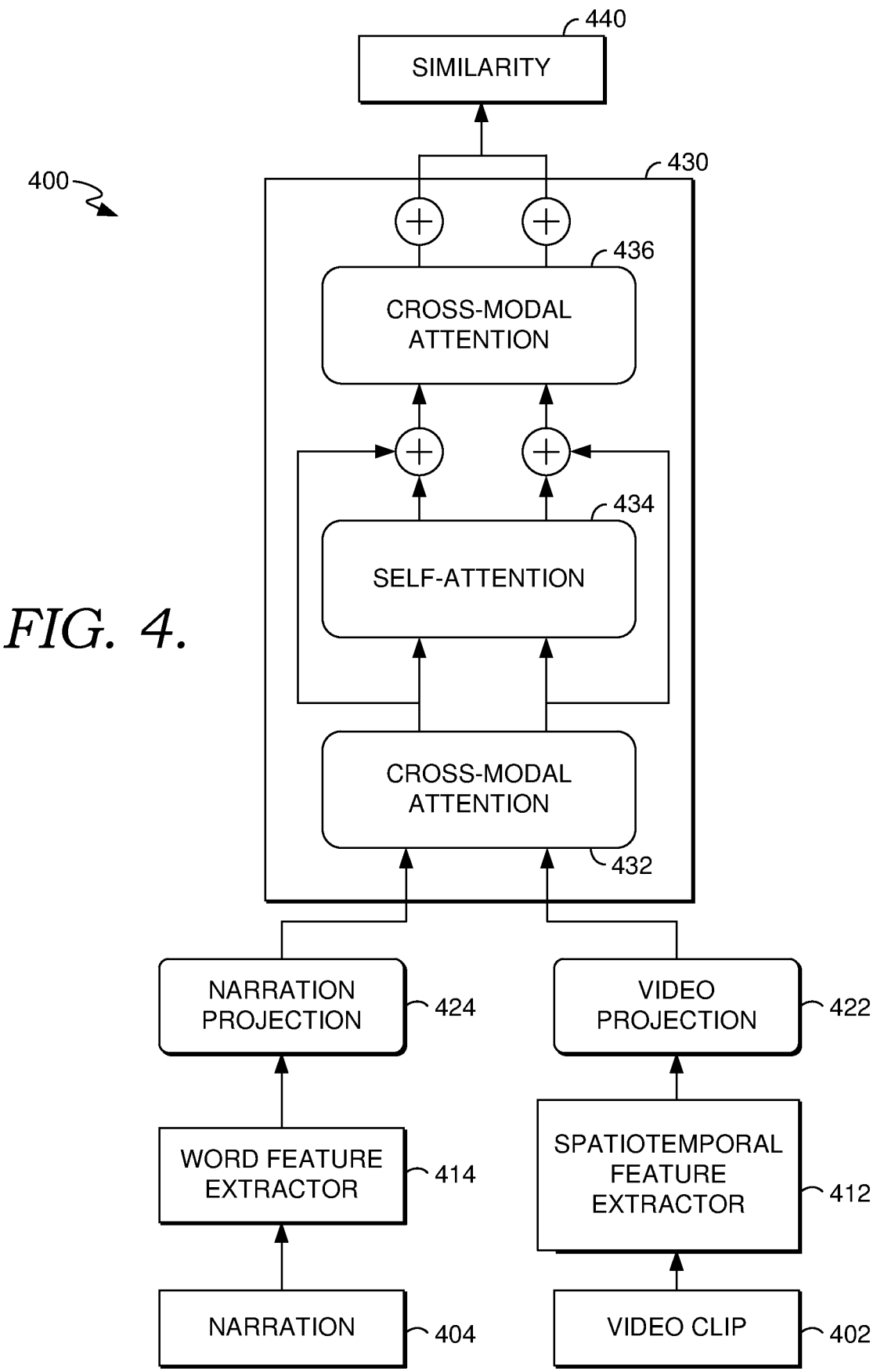
FIG. 4 illustrates an example neural network system for multi-modal attention, in accordance with various embodiments of the present disclosure.

FIG. 4 depicts an example architecture for a neural network system 400 that may be utilized for multi-modal localization in accordance with embodiments of this disclosure. The neural network system 400 of FIG. 4 may be an embodiment of the multi-modal localizer 200 of FIG. 2. In this example shown in FIG. 4, the first and second modalities are in the form of a video clip 402 and a narration 404, respectively. The narration 404 may be in the form of text data transcribed, either manually or automatically, from audio data extracted from the video clip 402.

The neural network system 400 includes a spatiotemporal feature extractor 412 that extracts spatiotemporal features from the video clip 402. The spatiotemporal feature extractor 412 may include a video encoder that generates a representation of the video. For example, the spatiotemporal feature extractor 412 may include an encoder in the form of an S3D Network having a mixed 5c layer from which the spatiotemporal features may be extracted. Similarly, the neural network system 400 includes a word feature extractor 414 that extracts features from the narration 404. In some aspects, the word feature extractor 414 is a shallow neural network implementing Word2Vec technique for natural language processing. The neural network system 400 may also include video projection layers 422 and narration projection layers 424 that are responsible for converting the feature representations output from the spatiotemporal feature extractor 412 and the word feature extractor 414, respectively, to a common dimensionality. In some embodiments, video projection layers 422 perform linear projection to convert the dimensionality of the extracted spatiotemporal features, and narration projection layers perform MLP projection to convert the dimensionality of the extracted word features.

From the projection layers, the word and spatiotemporal features are fed into a contrastive multi-layered and multi-modal attention module 430. The multi-modal attention module 430 includes multiple attention layers, including a first cross-modal attention layer 432 and a second cross-modal attention layer 436. The attention module 430 also includes a self-attention layer 434 between the first and second cross-modal attention layers 432 and 436. Each of the cross-modal attention layers 432 and 436 compare features from different modalities with each other. In this example, the cross-modal attention layers 432 and 436 compare spatiotemporal features and word features. Further, the self-attention layer 434 compares features within the same modalities such that spatiotemporal features are compared with spatiotemporal features and word features are compared with word features. Utilizing these cross-modal attention and self-attention layers, attention module 430 determines similarities 440 between spatiotemporal and word features in a similar manner as described with respect to the region-phrase localizer 230 of FIG. 2. In one example, similarities 440 output from attention module 430 may be in the form of a heat map for each frame of the input video clip 402 to indicate pixels within the frame having the highest similarities with a particular phrase (i.e., word feature).

FIGS. 5A-5D illustrate visual indicators of spatiotemporal localization of a narration within a video. FIGS. 5A-5D each depict a series of frames 500 in a video that includes corresponding audio data 510 narrating what is occurring within the series of frames 500. Specifically, while frames 502, 504, 506, and 508 are played, the audio output may be: "Put tomatoes into the backing tray. Cut the onions and add them to the tray." For simplification, only four frames are shown, but it should be understood that the series of frames 500 may include additional frames between each of the depicted frames that provide smoother transitions between the depicted frames.

Figure 5A:
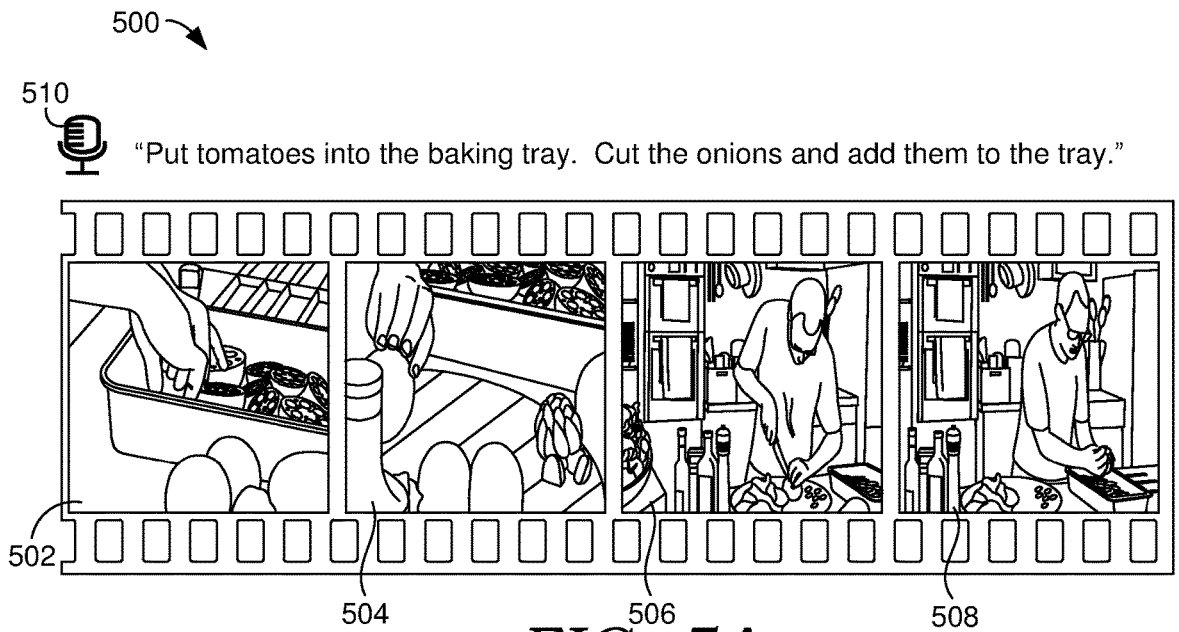
FIGS. 5A-5D illustrate example indicators representing spatiotemporal alignment of multiple modals, in accordance with various embodiments of the present disclosure.
Figure 5B:
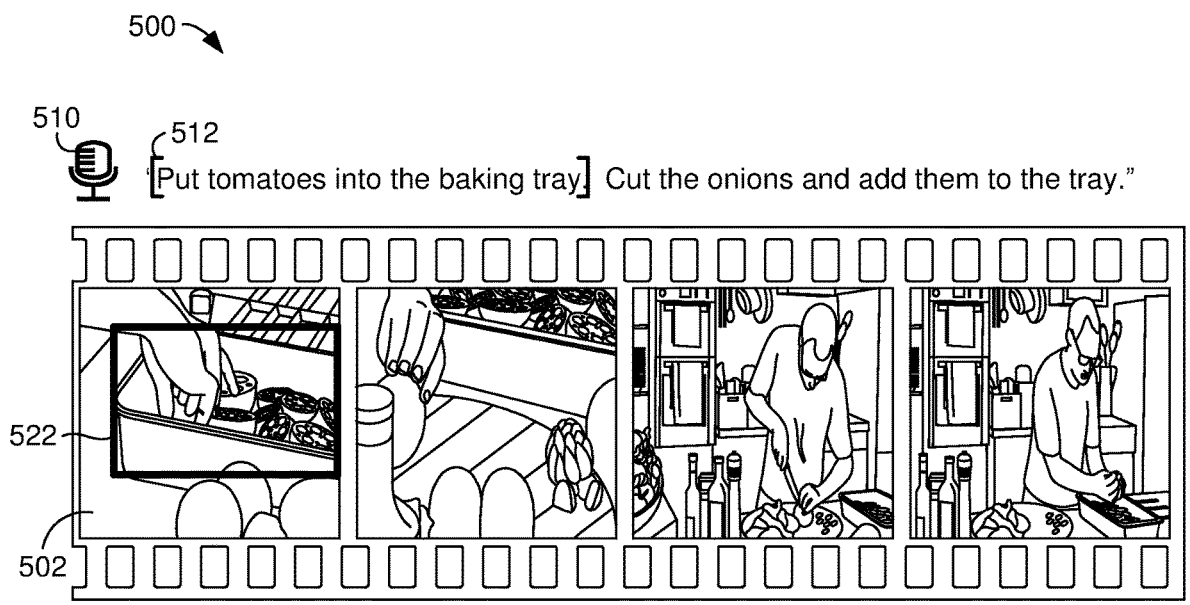

FIG. 5A depicts the series of frames 500 without spatiotemporal localization of the audio data 510. In this way, FIG. 5A may represent what is input into a multi-modal localizer, such as the multi-modal localizer 200. One or more phrases may be extracted from the audio data 510 and localized within the series of frames 500 as described with respect to FIGS. 2-4. For example, a first phrase 512 ("put tomatoes into the baking tray") may be extracted from the audio data 510, and a spatiotemporal region within the series of frames 500 may be identified as corresponding to the first phrase 512. As such in FIG. 5B, a localization indicator 522 may be provided for display to indicate the region, which is a subset of pixels within the frame 502. The localization indicator 522 may be displayed at the same time that the first phrase 512 is audibly output.

Figure 5C:
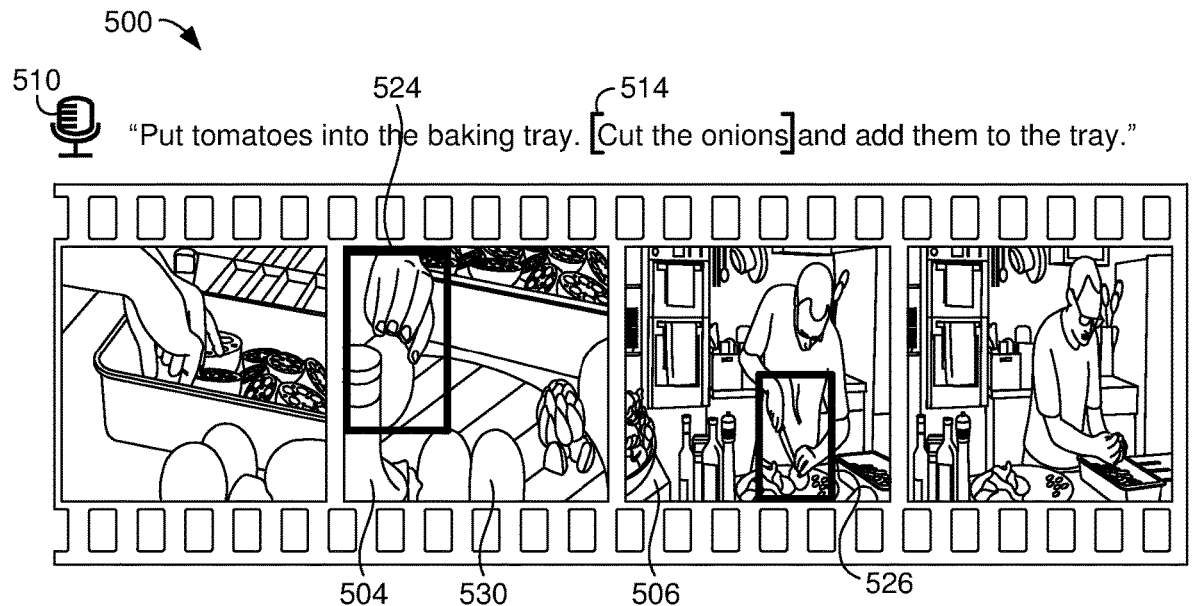

Similarly, a second phrase 514 ("cut onions") may be localized to subsets of pixels within the frames 504 and 506, and localization indicators 524 and 526 may be displayed to indicate the localized regions within frames 504 and 506, respectively. As illustrated by FIG. 5C, a single phrase, such as the second phrase 514, may be localized across multiple frames, and each frame may have a different subset of pixels that are determined to correspond to the second phrase 514.

Figure 5D:
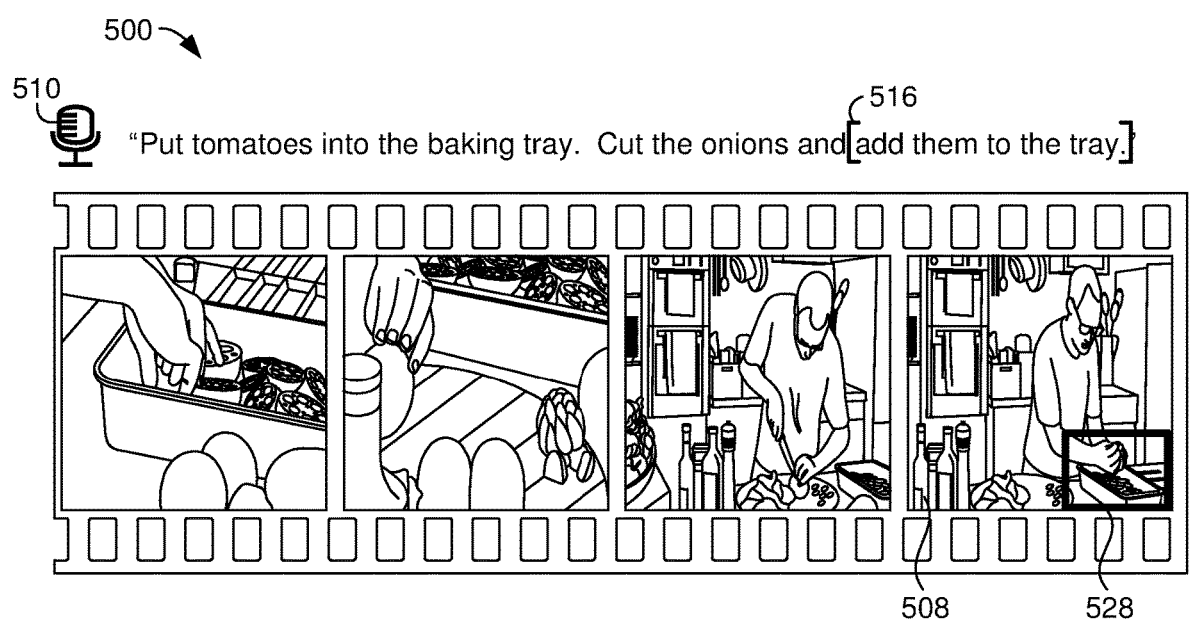

In FIG. 5D, a third phrase 516 ("add them to the tray") is localized to a subset of pixels within the frame 508, and a localization indicator 528 is displayed to visually represent the spatiotemporal localization of the third phrase 516. As shown in FIGS. 5C and 5D, the second phrase 514 and the third phrase 516 are part of a single sentence, and they both involve the same object ("onions"). However, the actions being done to the object (cutting versus adding to a tray) are different, resulting in different localizations. Further, the spatiotemporal localization described herein may be specific to an entire phrase (object and action), rather than just the object. For example, the frame 504 in FIG. 5C depicts onions 530 that are not relevant to the second phrase 514 because the onions 530 are not being cut. As such, the localization indicator 524 in FIG. 5C does not include the pixels corresponding to onions 530. In this way, embodiments of the disclosure may perform more complex spatiotemporal localization than conventional object grounding, which would simply localize "onion."

Figure 6:
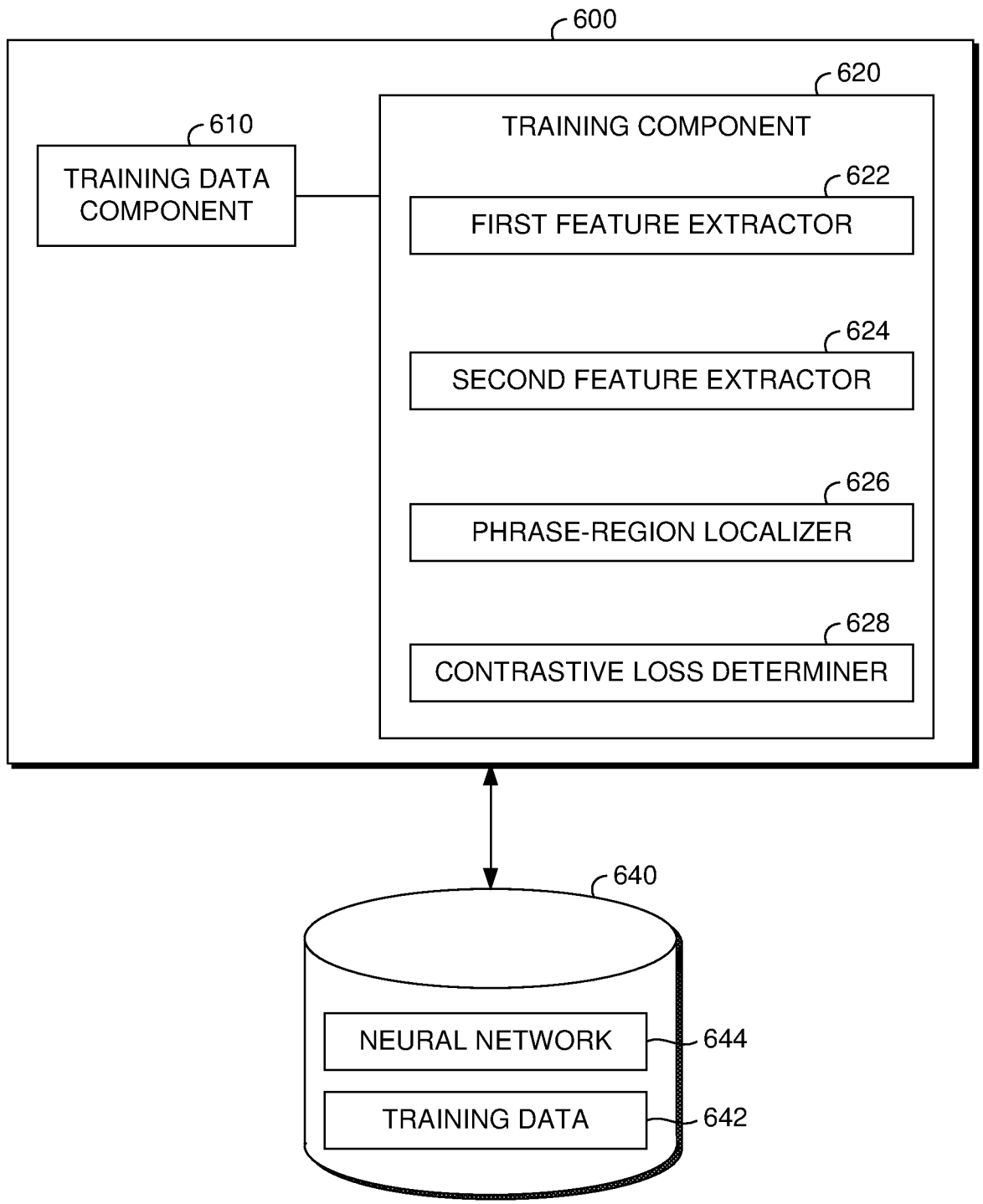
FIG. 6 illustrates an example embodiment for training a multi-modal localizer, in accordance with various embodiments of the present disclosure.

FIG. 6 depicts a training engine 600 that may be utilized to train a neural network system, such as a neural network system 400 of FIG. 4, to perform multi-modal localization. Training engine 600 includes a training data component 610 and a training component 620. Training data component 610 provides training data 642 that is fed into a neural network system 644 during training of the neural network system 644. The training data 642 comprises data of a first modality and a second modality. For example, the first modality may be image data, such as a series of frames forming a video, and the second modality may be audio data or text data corresponding to the image data. The second modality may include narrations of what is depicted in the image data.

The training data 642 may be stored in a data store 640, which may be an embodiment of data store 250 of FIG. 2. The first and second modalities may be stored in data store 640 as one data object, such as a video file, that includes image data and audio data. During training, however, the training data component 610 may partition the training data 642 so that first modality training data (e.g., image data) is separate from the second modality training data (e.g., audio data). In some aspects, the second modality training data is text data that was manually input or automatically transcribed from the audio data in a video. In some embodiments, training data component 610 performs one or more pre-processing steps, such as removing a pre-determined list of stop words, from the second modality training data. Embodiments of training engine 600 perform unsupervised learning, and as such, training data 642 does not include labeled ground truth data.

The training component 620 uses the training data 642 to train the neural network system 644 to localize a portion of one modality within another. Specifically, the training component 620 may train the neural network system 644 to perform spatiotemporal localization of phrases. Embodiments of the training component 620 may include a first feature extractor 622, a second feature extractor 624, a phrase-region localizer 626, and a contrastive loss determiner 628. While these components are shown separately, it should be appreciated that the functionality described in association therewith may be performed by any number of components.

First modality training data may be input into the first feature extractor 622. The first feature extractor 622 may be an embodiment of the first feature extractor 210 of FIG. 2. Therefore, the first feature extractor 622 may extract features from the first modality training data in a similar manner described with respect to the first feature extractor 210. Similarly, second modality training data may be input into the second feature extractor 624, which may be embodiment of the second feature extractor 220 of FIG. 2. The second feature extractor 624 may extract features from the second modality training data in a similar manner described with respect to the second feature extractor 220.

Further, the phrase-region localizer 626 of the training component 620 may utilize the features extracted from the first modality and second modality training data to determine a spatiotemporal region within the first modality training data that corresponds to a phrase within the second modality training data. The phrase-region localizer 626 may be an embodiment of the region-phrase localizer 230 of FIG. 2, and therefore, the determination of the relevant spatiotemporal region for a particular phrase may be performed in a similar manner as described with respect to the region-phrase localizer 230.

The contrastive loss determiner 628 of the training component 620 is generally configured to determine a contrastive loss, which also may be referred to as a contrastive objective, from the phrase-region pair identified as being corresponding by the phrase-region localizer 626. As previously described, the phrase-region localizer 626 may output a final spatiotemporal region representation ($\hat{C}$) and a final word representation ($\hat{S}$), which may be represented as:

$$\hat{C} = \frac{1}{T}\frac{1}{X}\sum_{k=1}^{T}\sum_{x=1}^{X} C_{fix} \text{ and } \hat{S} = \frac{1}{N}\sum_{j=1}^{N} S_{fj}$$

respectively. The contrastive loss determiner 628 may then determine the contrastive loss as follows:

$$L_{sentence}(\theta) = -\sum_{k=1}^{n} \log\left(\frac{\exp(\hat{C}^T \hat{S})}{\exp(\hat{C}^T \hat{S}) + \sum_{\hat{S}_{neg} \sim N_S} \exp(\hat{C}^T \hat{S}_{neg}) + \sum_{\hat{C}_{neg} \sim N_C} \exp(\hat{C}_{neg}^T \hat{S})}\right) \quad (5)$$

where the negative sets $\hat{S}_{neg} \sim N_s$ and $\hat{C}_{neg} \sim N_C$ comprises non-corresponding pairs of spatiotemporal regions and word features obtained from a given batch of the training data 642, and where n denotes the total number of samples in the batch. A non-corresponding pair, also referred to a negative pair, may be a spatiotemporal feature (i.e., a region) and a word feature (i.e., a phrase) that were not extracted from the same or associated data objects. For instance, a phrase and a region that are extracted from different video clips are non-corresponding. Where the first and second modalities are stored as separate but associated data objects, a phrase and a region are non-corresponding when the phrase is extracted from a second modality data that is not stored in association with the first modality data from which the region is extracted. Further, in some embodiments, phrase and regions may be determined to be non-corresponding when they are extracted from the same or associated data objects but do not have a predetermined temporal proximity. As such, a time stamp for the frame(s) within which the region is present and a time stamp for the phrase within the audio or text data may be determined and compared, and when these two time stamps are not within a pre-determined maximum time span, the region and phrase may be determined to be non-corresponding. In various embodiments, the pre-determined maximum time span for determining temporal proximity may be 5 seconds, 30 seconds, 1 minute, 10 seconds, or 5 seconds.

The word features may be sentence-level representations (also referred to as phrase-level representations) such that one feature may represent a series of words (a sentence/phrase). In this way, the contrastive loss value may comprise a sentence-level loss, rather than a word-level loss. In an embodiment actually reduced to practice, utilizing a sentence-level contrastive loss when training resulted in a 20% increase in localization accuracy compared to a word-level loss.

The contrastive loss value computed by the contrastive loss determiner 628 may be utilized to adjust the attention weights within the cross-modal attention and self-attention layers of the neural network system 644. The weights are adjusted so that the distance between corresponding (positive) phrase-region pairs will be minimized and the distance between non-corresponding (negative) phrase-region pairs will be maximized in future iterations of the neural network system 644. In this way, the neural network system 644 may be trained in an unsupervised manner without training labels, which improves the efficiency of the training process as more data may be utilized for training data 642 without the time-consuming process of labeling.

Figure 7:
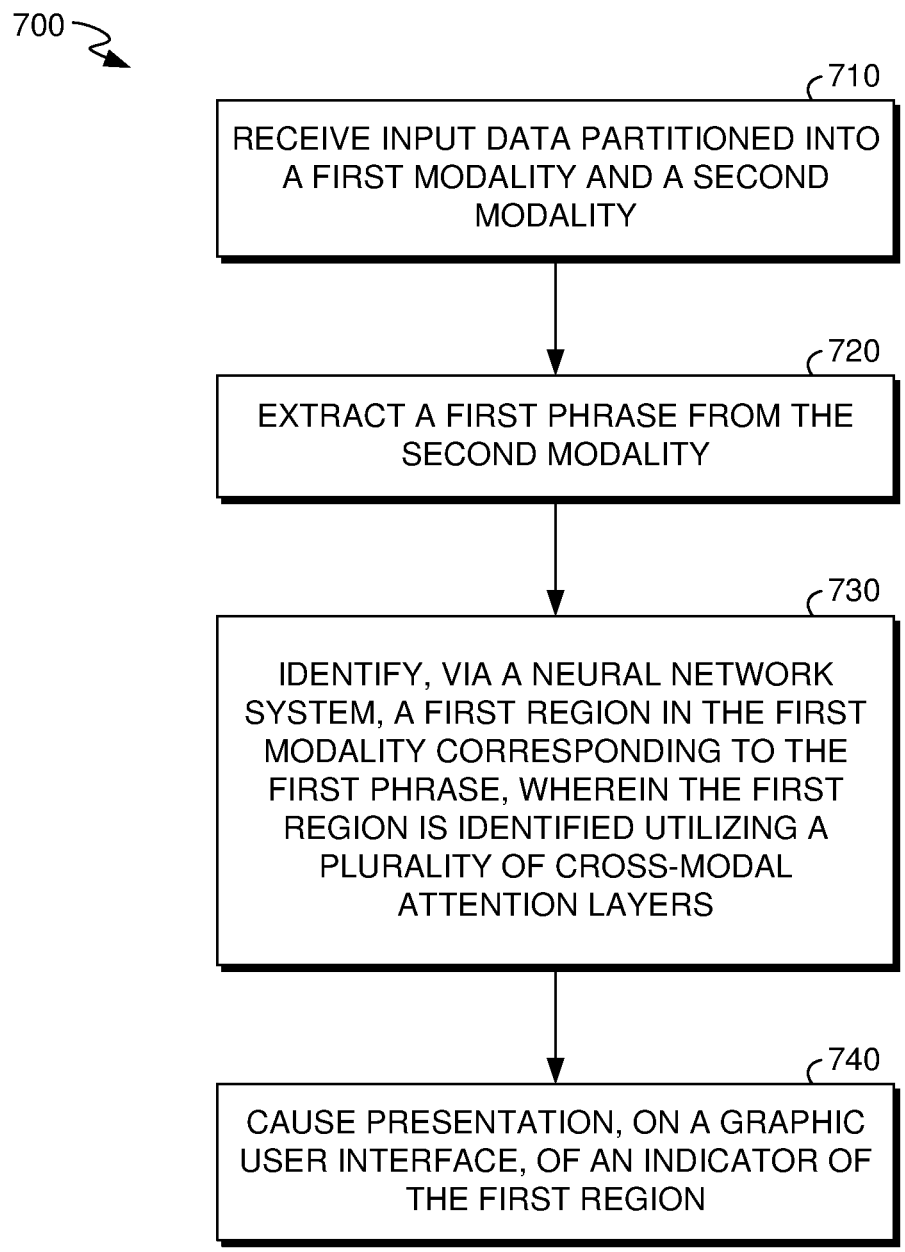
FIG. 7 illustrates an example method for performing multi-modal localization, in accordance with various embodiments of the present disclosure.
Figure 8:
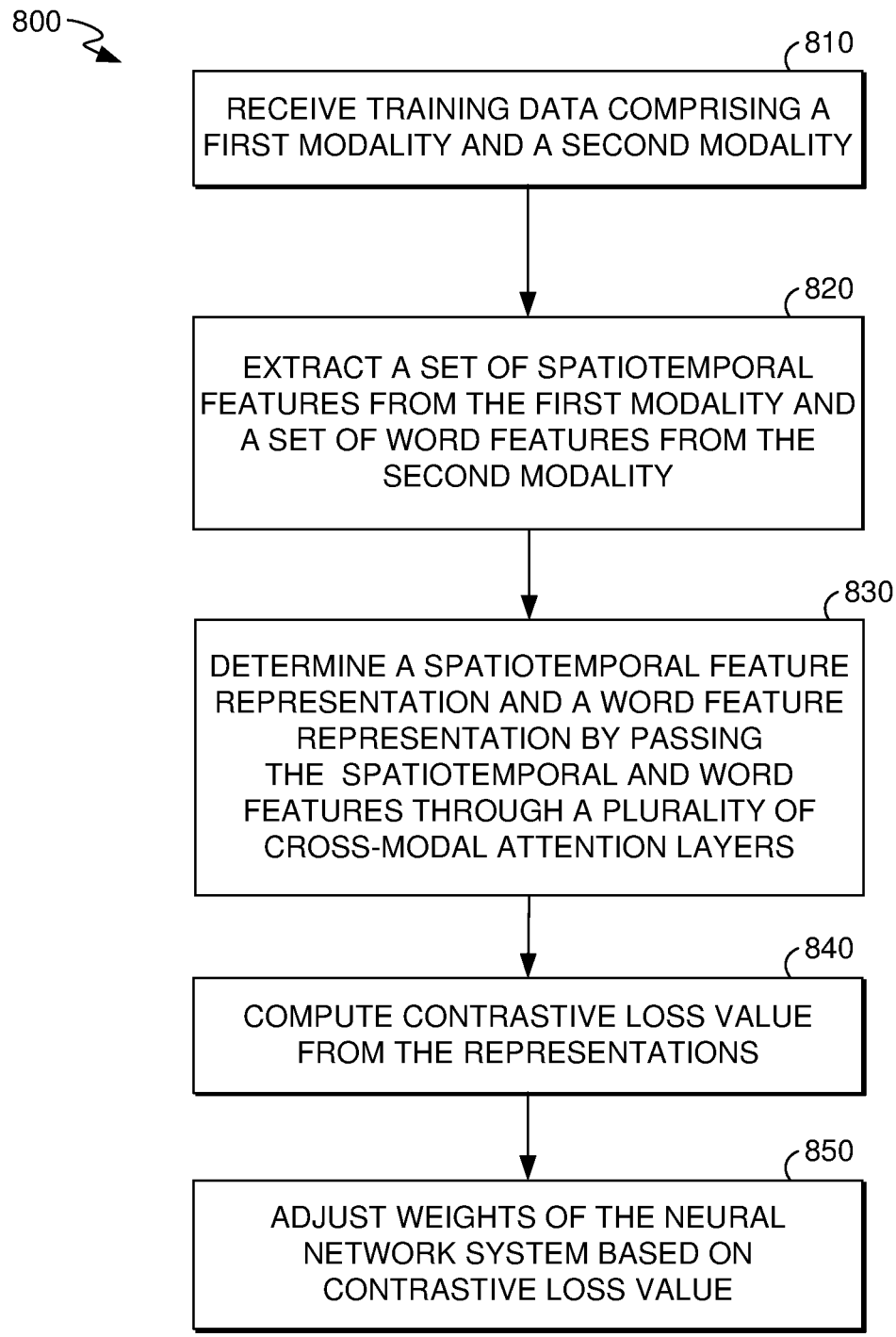
FIG. 8 illustrates an example method for unsupervised training of a multi-modal localizer, in accordance with various embodiments of the present disclosure.

With reference to FIGS. 7 and 8, flow diagrams are provided to show example methods 700 and 800 for performing multi-modal localization in accordance with embodiments of the disclosure. Methods 700 and 800 and any other methods disclosed herein each include steps that correspond to different functions performed by the same or different hardware components on one computing device, which may be a user device or a remote server. Additionally or alternatively, some or all of these steps in these methods may be performed on hardware components of different computing devices such that these methods may be performed in a distributed fashion.

Method 700 of FIG. 7 depicts an example method for localizing a phrase within a spatiotemporal region. Method 700 may be performed by an embodiment of the multi-modal localizer 200 of FIG. 2. At block 710 of FIG. 7, input data partitioned into a first modality and a second modality is received. The first modality may comprise image data, and the second modality may be either audio data or text data associated with the image data. In some aspects, the audio or text data of the second modality may be a narration of what is depicted in the image data of the first modality and may include narrations of interactions between objects. It should be understood that at least one object involved in the narrated interaction may be implied. For example, a narration of one video clip may be to "kick the soccer ball", which is an interaction between the soccer ball and an implied object of a person.

At block 720, a first phrase is extracted from the second modality. The first phrase may be extracted by applying natural language processing to identify the first phrase. In embodiments in which the second modality is input as audio data, extracting the first phrase may also include determining text data corresponding to the audio data by applying automatic speech recognition. Additional phrases within the second modality may also be extracted in this manner.

At block 730, a first region from the first modality is identified, via a neural network system, as corresponding to the first phrase. Block 730 may be performed by an embodiment of the region-phrase localizer 230 of FIG. 2. The region may be a subset of pixels within a frame of the image data. Additionally, the neural network system utilized at block 730 may be an embodiment of the neural network system 400 of FIG. 4. In exemplary aspects, the neural network system includes a plurality of cross-modal attention layers for comparing features from the first modality with features from the second modality. Each cross-modal attention layer may be bidirectional in that, at each cross-modal attention layer, feature from one modality (e.g., spatiotemporal features) may act as both a query and a key and features from the other modality (e.g., word features) may act as both a query and a key. Further, the cross-modal attention layers may alternative with at least one self-attention layers for comparing features from the first modality with other features from the first modality and comparing features from the second modality with other features from the second modality. The neural network system used at block 730 may not include a full attention layer.

To identify the first region in the first modality that corresponds to the first phrase from the second modality, a set of spatiotemporal features may be extracted from the first modality and a set of word features may be extracted from the second modality. Using these sets of features, similarity scores may be computed between regions within the first modality and the first phrase within the second modality. Similarity scores may be computed by determining the Hadamard product of query and key matrices both where the word features are the query and where the spatiotemporal features are the query as further explained with respect to the region-phrase localizer 230 of FIG. 2.

In some embodiments, the spatiotemporal regions for which similarity with the first phrase is determined are spatiotemporal regions within frames having a time stamp within a predetermined duration within either direction of a time stamp of the first phrase within the second modality. In this way, similarity scores may be computed for region-phrase pairs that have a temporal proximity and, therefore, are more likely have higher similarity scores than pairs with no temporal proximity. In various embodiments, the pre-determined duration may be 5 seconds, 30 seconds, 1 minute, 10 seconds, or 5 seconds.

The spatiotemporal region in the first modality having the highest similarity score relative to other regions is identified as corresponding to the first phrase. In one embodiment, a heat map representing the first modality may be generated to indicate the relative degree of similarity between the first phrase and various regions within the first modality. Similarity scores may also be computed for spatiotemporal regions and other phrases extracted from the second modality.

At block 740, method 700 includes causing an indicator of the first region to be presented on a graphic user interface. Block 740 may be performed by an embodiment of the localization indicator 240 of FIG. 2. The graphic user interface may be on a user device that is be an embodiment of user device 102a, 102b, or 102n of FIG. 1. The indicator may include an object that is displayed with the input first modality data. In some aspects, the indicator on the graphic user interface includes a bounding box applied around the first region. Example indicators are depicted in FIGS. 5A-5D. Additionally or alternatively, the indicator may include a change in a visual property, such as brightness levels and/or color channels levels, of the first region. The change in the visual property that occurs for pixels within the first region may not occur for pixels outside the first region. Alternatively, the indicator may include a change in a visual property of pixels outside the first region to create a visual contrast with the first region. In some aspects, there may be changes to a visual property for pixels within the first region as well as to pixels outside the first region, but the changes are not the same so that there is still a visual contrast.

FIG. 8 depicts an example method 800 for training a neural network system to perform multi-modal localization in accordance with embodiments of the disclosure. One or more blocks of method 800 may be performed by embodiments of the training engine 600 of FIG. 6. Exemplary aspects of method 800 are unsupervised training such that training is performed without ground truth data.

At block 810, training data is received. The training data, which may be an embodiment of training data 642 of FIG. 6, includes a first modality and a second modality. The first modality may include image data, and the second modality includes one of audio data or text data corresponding to the image data. At block 820, a set of spatiotemporal features is extracted from the first modality and a set of word features is extracted from the second modality. Extraction of the spatiotemporal features may be performed by an embodiment of the first feature extractor 622 of FIG. 6, and extraction of the word features may be performed by an embodiment of the second feature extractor 624 of FIG. 6. Extraction of spatiotemporal features may include encoding the image data to an initial representation of spatiotemporal features within the first modality. In embodiments in which the second modality is audio data, extraction of the word features may include determining text data corresponding to the audio data using automatic speech recognition and encoding the text data to an initial representation of word features using natural language processing algorithms. In embodiments in which the second modality is text data, extraction may only include encoding the text data to an initial representation.

At block 830, a spatiotemporal feature representation and a word feature representation are determined using the neural network system. Block 830 may be performed by an embodiment of the phrase-region localizer 626 of FIG. 6. Block 830 includes passing the set of spatiotemporal features and the set of word features through a plurality of cross-modal attention layers within the neural network system to determine the spatiotemporal feature representation and the word feature representation. In exemplary embodiments, the cross-modal attention layers within the neural network system alternate with at least on self-attention layer. For example, the neural network system may include a first cross-modal layer, a self-attention layer, and then a second cross-modal layer. Embodiments of the neural network system utilized at block 830 does not include a full attention layer. An example network architecture is depicted in FIG. 4. As many representations of each spatiotemporal and word feature may be computed during attention, it should be understood that the representation of features determined at block 830 refers to a final representation after applying all of the attention mechanisms.

At block 840, a contrastive loss value is computed from the representation of the spatiotemporal features and the representation of the word features. Block 840 may be performed by an embodiment of the contrastive loss determiner 628 of FIG. 6. The contrastive loss function may operate to compare the similarity or distance between the spatiotemporal and word representations from block 830 from negative sets comprising non-corresponding spatiotemporal-word pairs. A non-corresponding pair includes a spatiotemporal feature and word feature that are extracted from different or non-associated input data files or that are extracted from the same or associated input data files but do not have temporal proximity. Further, it should be understood that the word features may be sentence-level representations such that one feature may represent a series of words (a sentence or phrase), and the contrastive loss value may comprise a sentence-level loss, rather than a word-level loss.

At block 850, weights within the neural network system are adjusted based on the contrastive loss. The weights are adjusted so that the distance between corresponding (positive) spatiotemporal-word feature pairs will be minimized and the distance between non-corresponding (negative) pairs will be maximized in future iterations of the neural network system.

Figure 9:
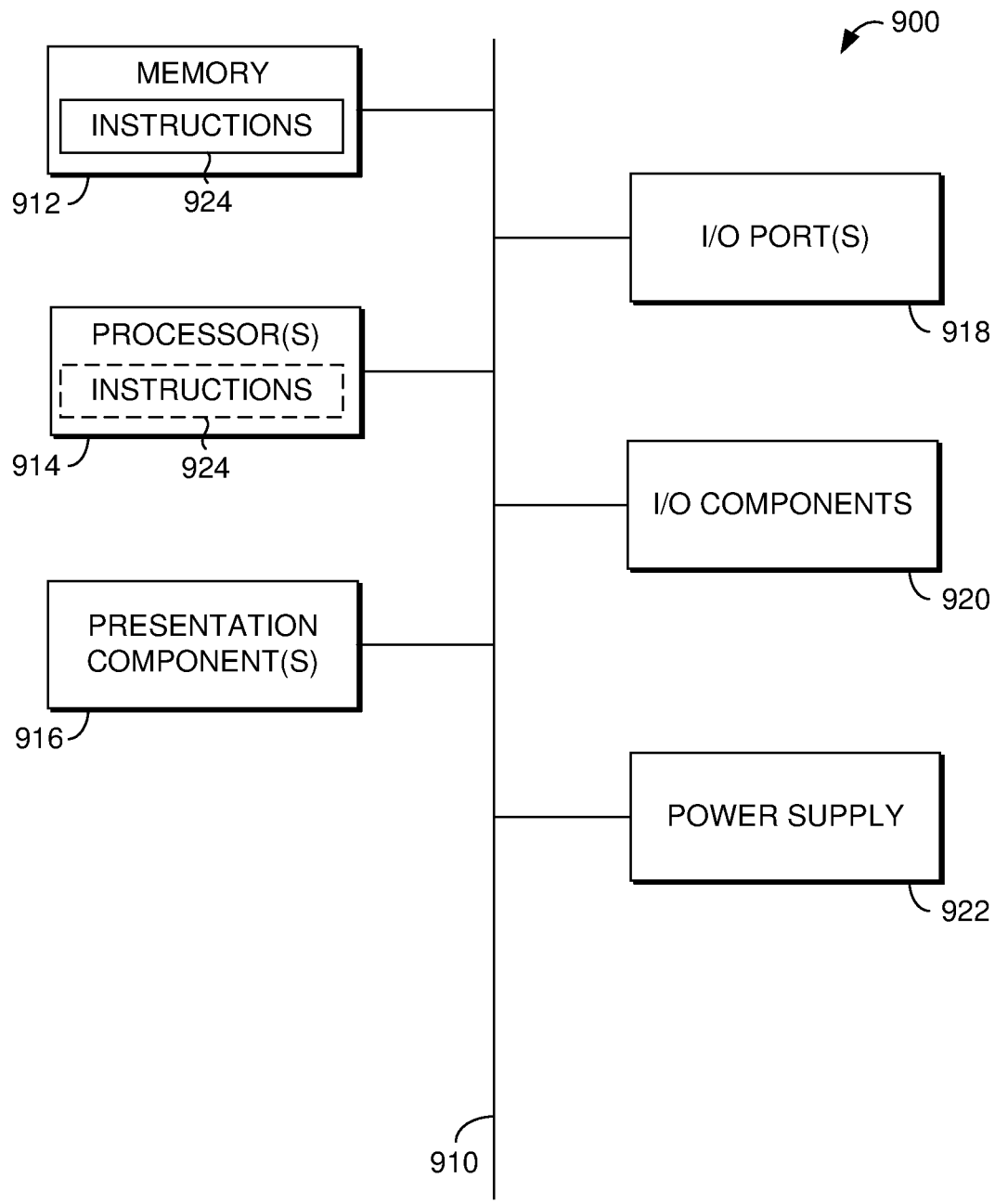
FIG. 9 is a block diagram of an example computing device in which various embodiments of the present disclosure may be employed.

Having described embodiments of the present invention, FIG. 9 provides an example of a computing device in which embodiments of the present invention may be employed. Computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 9 is merely illustrative of an exemplary computing device that can be used in connection with one or more embodiments of the present invention. Distinction is not made between such categories as "workstation," "server," "laptop," "handheld device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 900. Computing device 900 may be equipped with depth cameras, such as stereoscopic camera systems, infrared camera systems, RGB camera systems, and combinations of these, for gesture detection and recognition. Additionally, computing device 900 may be equipped with accelerometers or gyroscopes that enable detection of motion. The output of the accelerometers or gyroscopes may be provided to the display of computing device 900 to render immersive augmented reality or virtual reality.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. A computer-implemented method for localizing language in image data, the computer-implemented method comprising:
    receiving input data comprising a video partitioned into a first modality and a second modality, the first modality being image data comprising a plurality of frames and the second modality being one of audio data or text data corresponding to the image data;
    extracting a first phrase from the second modality;
    identifying, via a neural network system, a first spatiotemporal region in the first modality corresponding to the first phrase, the first spatiotemporal region comprising a first frame from the plurality of frames and a portion of pixels within the first frame, wherein the first spatiotemporal region is identified utilizing a plurality of cross-modal attention layers in the neural network system to compare features from the first modality with features from the second modality; and
    causing presentation, on a graphic user interface, of an indicator of the first spatiotemporal region.

2. The computer-implemented method of claim 1, wherein the plurality of cross-modal attention layers alternate with at least one self-attention layer.

3. The computer-implemented method of claim 1, wherein a full attention layer is absent from the neural network system.

4. The computer-implemented method of claim 1, wherein identifying, via the neural network system, the first spatiotemporal region in the first modality corresponding to the first phrase extracted from the second modality comprises:
    extracting a set of spatiotemporal features from the first modality and extracting a set of word features from the second modality; and
    computing similarity scores between at least the first phrase within the second modality and regions within the first modality using the set of spatiotemporal features and the set of word features, wherein the first spatiotemporal region identified in the first modality as corresponding to the first phrase has the highest similarity score relative to other regions within the first modality.

5. The computer-implemented method of claim 4, wherein each cross-modal attention layer is bidirectional in that, at each cross-modal attention layer, the set of spatiotemporal features are utilized for a query with the set of word features are utilized for a key and the set of spatiotemporal features are utilized for a key with the set of word features are utilized for a query.

6. The computer-implemented method of claim 1, wherein the second modality comprises audio data, and wherein extracting the first phrase comprises extracting text from the audio data utilizing automatic speech recognition and performing natural language processing to identify the first phrase.

7. The computer-implemented method of claim 1, wherein the indicator on the graphic user interface comprises a bounding box around the first spatiotemporal region.

8. A computerized system for localizing language across other modalities, the computerized system comprising:
   at least one processor; and
   one or more computer storage media storing computer-usable instructions that, when executed by the at least one processor, cause the at least one processor to perform operations comprising:
      receiving input data partitioned into a first modality and a second modality, the first modality being image data comprising a plurality of frames and the second modality being one of audio data or text data corresponding to the image data;
      extracting a first phrase from the second modality;
      identifying, via a neural network system, a first spatiotemporal region in the first modality corresponding to the first phrase, the first spatiotemporal region comprising a first frame from the plurality of frames and a portion of pixels within the first frame, wherein the first spatiotemporal region is identified utilizing a plurality of cross-modal attention layers in the neural network system to compare features from the first modality with features from the second modality; and
      causing presentation, on a graphic user interface, of an indicator of the first spatiotemporal region.

9. The computerized system of claim 8, wherein the first phrase narrates an interaction between two objects.

10. The computerized system of claim 8, wherein identifying, via the neural network system, the first spatiotemporal region in the first modality corresponding to the first phrase extracted from the second modality comprises:
    extracting a set of spatiotemporal features from the first modality and extracting a set of word features from the second modality; and
    computing similarity scores between at least the first phrase within the second modality and multiple regions within the first modality using the set of spatiotemporal features and the set of word features, wherein the first spatiotemporal region identified in the first modality as corresponding to the first phrase has the highest similarity score relative to other regions within the first modality.

11. The computerized system of claim 10, wherein the operations further comprise, based on similarities scores for regions within the first modality, generating a heat map for the first modality.

12. The computerized system of claim 11, wherein the indicator of the first spatiotemporal region comprises at least a portion of the heat map corresponding to the first spatiotemporal region.

13. The computerized system of claim 8, wherein the plurality of cross-modal attention layers alternate with at least one self-attention layer.

14. The computerized system of claim 8, wherein a full attention layer is absent from the neural network system.

15. The computerized system of claim 8, wherein the indicator on the graphic user interface comprises a change in one or more of a brightness level and a color channel level for the portion of pixels within the first frame corresponding to the first spatiotemporal region, and wherein the change does not occur for pixels of the first frame outside the first spatiotemporal region.

16. A computer-implemented method for unsupervised training of neural network system, the computer-implemented method comprising:
    receiving training data, the training data comprising a first modality and a second modality, wherein the first modality comprises image data having a plurality of frames and the second modality comprises one of audio data or text data corresponding to the image data;
    extracting a set of spatiotemporal features from different spatial and temporal portions of the image data of the first modality;
    extracting a set of word features from the second modality;
    determining a spatiotemporal feature representation and a word feature representation at least by passing the set of spatiotemporal features and the set of word features through a plurality of cross-modal attention layers within the neural network system;
    computing a contrastive loss value from the spatiotemporal feature representation and the word feature representation; and
    adjusting weights within the neural network system based on the contrastive loss value.

17. The computer-implemented method of claim 16, wherein the plurality of cross-modal attention layers alternate with at least one self-attention layer within the neural network system.

18. The computer-implemented method of claim 16, a full attention layer is absent from the neural network system.

19. The computer-implemented method of claim 16, wherein the word feature representation comprises a sentence-level representation corresponding to a plurality of words, wherein the contrastive loss value comprises a sentence-level loss.

* * * * *